(12) United States Patent
Dhanapal et al.

(10) Patent No.: US 7,675,946 B2
(45) Date of Patent: Mar. 9, 2010

(54) SYSTEM AND METHOD FOR MANAGING PLAYOUT TIME IN PACKET COMMUNICATION NETWORK

(75) Inventors: Karthikeyan Balaji Dhanapal, Bangalore (IN); Abdul Sakib Mondal, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 719 days.

(21) Appl. No.: 11/480,486

(22) Filed: Jul. 5, 2006

(65) Prior Publication Data
US 2008/0008096 A1  Jan. 10, 2008

(30) Foreign Application Priority Data
Aug. 22, 2005 (IN) .................. 1162/CHE/2005

(51) Int. Cl.
*H04J 3/06* (2006.01)
(52) U.S. Cl. .................. 370/516; 370/235; 370/394
(58) Field of Classification Search .................. None
See application file for complete search history.

(56) References Cited

U.S. PATENT DOCUMENTS

| | | | |
|---|---|---|---|
| 6,259,677 B1* | 7/2001 | Jain | 370/252 |
| 2004/0057383 A1* | 3/2004 | Tseng et al. | 370/252 |
| 2005/0094622 A1* | 5/2005 | Mallila | 370/352 |

* cited by examiner

*Primary Examiner*—Jayanti K Patel
*Assistant Examiner*—Anthony Sol
(74) *Attorney, Agent, or Firm*—Marc S. Kaufman; Nixon Peabody, LLP

(57) ABSTRACT

A system, method, and computer program product for dynamically managing packet delay of a received packet of data between multiple endpoints, including a delay estimator module adapted to calculate packet delay of the received packet of data. The system further includes a predictor module adapted for predicting a playout time for each received packet of data indicative of the calculated packet delay of the at least one received packet of data. Furthermore, the system includes a buffer module adapted for buffering the received packet of data for a variable amount of time and a player module adapted for playing only the received packet of data and to discard packets of data received after the predicted playout time. The delay estimator is adapted to calculate maximum delay of all the packets of data received in an interval within a predetermined threshold indicative of the calculated packet delay.

16 Claims, 5 Drawing Sheets

SYSTEM AND METHOD FOR MANAGING PLAYOUT TIME IN PACKET COMMUNICATION NETWORK

BACKGROUND OF THE INVENTION

1. Field of the Invention

The invention relates generally to communication network, and more particularly to a system and method for effective transportation of packetized data communication.

2. Discussion of the Background

Communication network includes devices that comprise of hardware and software systems and utilizes interdependent processes to enable the processing and transmission of analog and digital signals. The transmission of signals are done seamlessly across and between circuits switched and packet switched networks. As an example, a voice over packet gateway enables the transmission of human voice from a conventional public switched network to a packet switched network. Such media over packet communication devices (e.g., Media Gateways) require substantial processing power with sophisticated software controls and applications to enable the effective transmission of data from circuit switched to packet switched networks and back again. One form of media transmission, referred to as voice-over-IP (VoIP), is the transport of voice traffic through the use of the Internet protocol.

VoIP requires notably less average bandwidth than a traditional circuit-switched connection for several reasons. First, by detecting when voice activity is present, VoIP can choose to send no data when a speaker on one end of a conversation is silent. Second, the digital audio bit stream utilized by VoIP may be significantly compressed before transmission using a codec (compression/decompression) scheme. However, there can be delay in receiving data packets.

The characteristics of these networks are such that the total delay experienced by each data packet is a function of variable delays due to physical media access and queuing in addition to fixed propagation delays. The result is that the time difference between transmitting any two packets at the source is unlikely to be the same as that observed upon their arrival at the destination. The delay variations are a particular problem for a stream of multimedia packets, because deviations of inter packet delay can have an impact on the audio-visual quality as perceived by the user.

Typically, synchronization methods are used at the receiver to handle delay variations. These synchronization methods usually operate by selectively choosing to drop certain packets deemed to be late or by adding further playback delays to certain packets at the receiver. The playback delay represents delay experienced at the playback location. Thus, the total delay experienced by any packet represents the sum of network delay and playback delay.

The synchronization methods typically store and track the trends of the delays occurring within the network. Since the network characteristics vary with time, these trends vary, and current information is necessary for the methods to be effective. The methods known in the art include the "full aggregation" method wherein all of the data is accumulated into a single distribution curve throughout the lifetime of the transmission or the "flush and refresh" approach in which statistical samples are stored for a period of time and then periodically flushed and refreshed.

However, some of the above methods are not dynamic and are not suitable for a wide range of applications, which are sensitive to total end-to-end delay (TED).

Accordingly, there is a need for a technique that enables an effective and improved method for predicting and adjusting future TED dynamically to measure network delays and thereby, effectively managing packet delays.

SUMMARY OF THE INVENTION

In accordance with an exemplary embodiment of the present technique, a system for dynamically managing packet delay of at least one received packet of data between multiple endpoints is disclosed. The system includes a delay estimator module adapted to calculate packet delay of the at least one received packet of data. The system further includes a predictor module adapted for predicting a playout time for each received packet of data indicative of the calculated packet delay of the at least one received packet of data. Furthermore, the system includes a buffer module adapted for buffering the at least one received packet of data for a variable amount of time and a player module adapted for playing only the received packet of data within the predicted playout time and to discard packets of data received after the predicted playout time. The delay estimator module is adapted to calculate maximum delay of all the packets of data received in an interval within a predetermined threshold indicative of the calculated packet delay.

In accordance with another exemplary embodiment of the present technique, a method of exchanging at least one received packet of data between multiple end points in real time is disclosed. The method includes calculating packet delay of the at least one received packet of data using a delay estimator module and predicting a playout time for each packet of data indicative of the calculated packet delay of the at least one received packet of data using a predictor module. The method further includes buffering the at least one received packet of data for a variable amount of time via a buffer module and playing only the received packet of data and discarding the packet of data received after the predicted playout time using a player module. The delay estimator module is adapted to calculate maximum packet delay of all the packets of data received in an interval within a predetermined threshold indicative of the calculated packet delay.

In accordance with yet another exemplary embodiment of the present technique, computer program comprising one or more tangible media is disclosed. The one or more tangible media includes code adapted to calculate packet delay of at least one received packet of data received via a delay estimator module and code adapted to predict a playout time for each packet of data indicative of the calculated delay of the at least one received packet of data via a predictor module. The one or more tangible media further includes code adapted to buffer the at least one received packet of data for a variable amount of time via a buffer module and code adapted to play only the received packet of data and discard packets of data received after the predicted playout time via a player module. It should be noted that the delay estimator module is adapted to calculate maximum delay of all the packets of data received in an interval within a predetermined threshold indicative of the calculated packet delay.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE PREFERRED EMBODIMENTS

Figure 1:
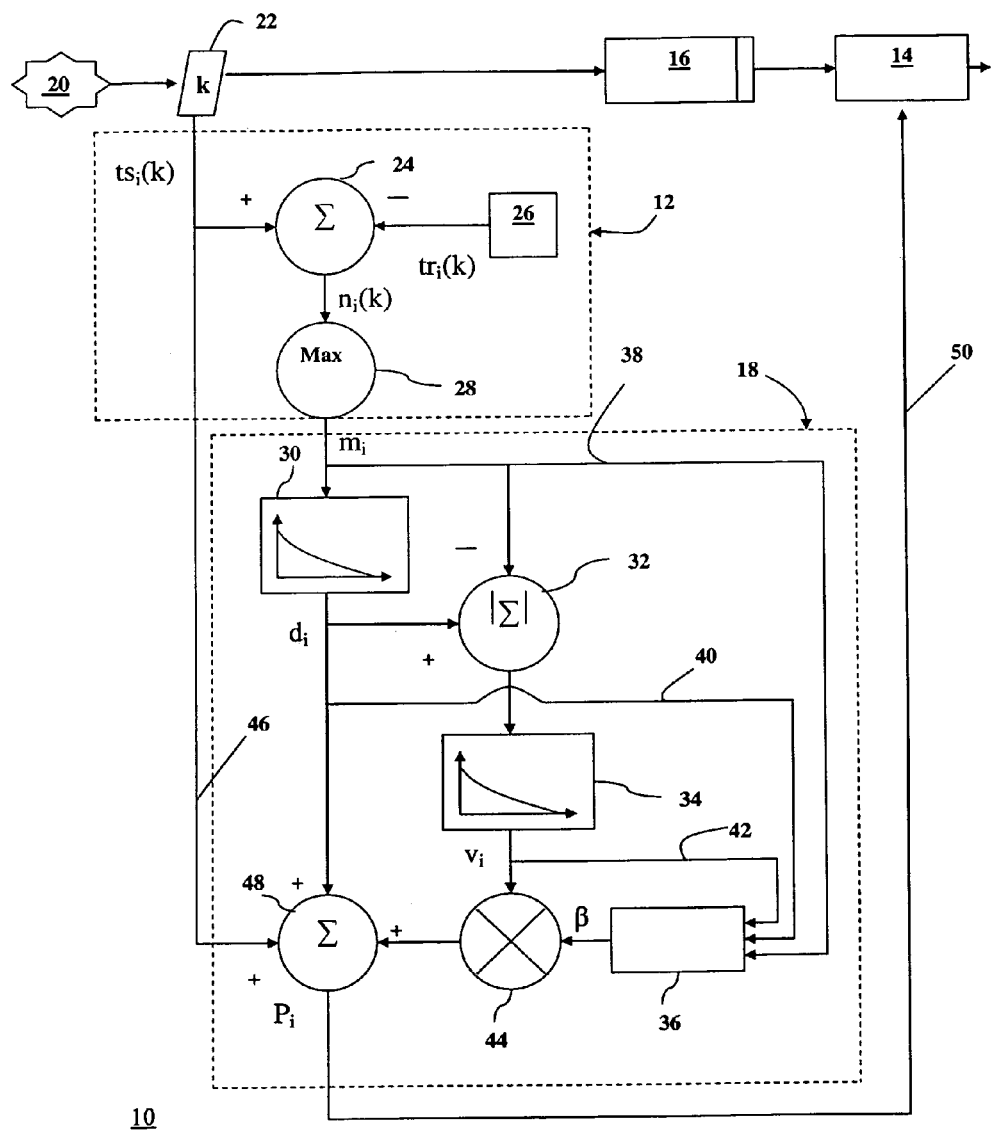
FIG. 1 is a block diagram illustrating a playout packet delay system, in accordance with an aspect of the present technique.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

The following discussion relates generally to a system for managing playout time in packet communication network. The various implementations discussed herein are generally adapted for improving the efficiency of the playout time in packet communication network.

As will be appreciated by people skilled in the art, to best understand the present invention it is important to be familiar with the environment in which it is used. Data is communicated over a packet switched network in packets, which requires no dedicated circuits. Each packet contains information that allows the data network to route it to the appropriate destinations.

A data stream is defined as a sequence of packets of data used for transferring data between multiple endpoints. Each packet of data includes two basic components: the data component, which is the "actual" data being transmitted for use by the endpoint, and the "overhead" component, which includes identifying information about the packet of data. For example, each packet of data is marked with stream identification and a sequence number as well as timing information of the endpoints (sender and receiver). This kind of identifying information is part of the overhead component of the packet. These packets of data are generally used in voice over internet protocol (VoIP).

VoIP is a process of digitizing and sending voice in the form of packets of data over the internet or other data network using internet protocol. However, there are certain issues in VoIP such as packet loss, delay and delay variation which affect the quality of voice at receiving end. It should be noted that in the present discussions with regard to certain implementations of the present technique, the packets of data may include at least one of a voice, videophone, or other real-time interactive communication or combinations thereof.

Packet delay is the amount of time the packet of data takes to reach the intended endpoint. Real time data, as understood in the art, refers to packet of data whose usefulness decays rapidly if delayed by more than a pre-determined delay range, such as in VoIP.

Jitter is the variation in inter-arrival time of packets at the receiver endpoint. The jitter may be reduced by playout algorithm at the receiver endpoint. The receiver endpoint buffers the received packet of data and plays at a latter time called a playout time of the packet of data, as decided by the playout algorithm. Playout algorithm may be defined as a sequence of instructions used to deduce the playout time at the received endpoint. This stores packets till the playout time, which may be called generally as buffering. While, large buffering time may reduce packet loss due to late arrivals, the increased delay in playout affects interactivity. Hence, a good playout algorithm must balance the loss versus the interactivity.

In a VoIP session, the transmitter sends packets periodically (typically after every 20 ms) to the receiver. These packets arrive at the receiver with varying delays. If the first packet is played immediately after receiving it, then it will be difficult to play packets which are delayed more than the first packet at their scheduled playout times, because the packets are not received by then. In a sense, these are "lost" packets. So the playout of the packets are delayed, so that even these late packets can be played. The trade-off here is that, more the playout delay, lesser will be the loss-rate, and vice-versa. There are two classes of playout algorithms viz. fixed and adaptive playout delay algorithms The fixed playout algorithm determines by some means (such as statistical analysis of past sessions) a suitable (common) value of the maximum permissible end-to-end packet delays, and uses that to decide the playout time of packets of data. On the other hand, adaptive class of algorithms vary their buffering delays with changing network conditions which may lead to better performance than fixed playout algorithm. The scheme proposed in the present technique may be categorized to the second category. The actual adjustment in playout delay may be made only at the start of a talkspurt, because adjustment within a talkspurt will deteriorate voice-quality. The talkspurt is a period of continuous voice activity (a sentence or part of a sentence). It should be noted that with real time packet (RTP), this difference will include an offset equal to the difference between the sender and receiver clock references.

Referring now to FIG. 1, a block diagram illustrating a playout packet delay system 10, in accordance with an aspect of the present technique is disclosed. The system 10 includes a delay estimator module 12, a player module 14, a buffer module 16 and a predictor module 18. The detail of these four modules (12-18) and the functionalities of these modules will be explained further in detail in the subsequent sections.

The system 10 further includes a packet network 20 which serves as transmission medium between the sender endpoint and receiver endpoint. The transmission involves having a packet of data (k), containing a timestamp $ts_i$ (k) affixed to packet of data (k) belonging to talkspurt i by the sender. This packet of data k may be received from packet network 20 by the receiver. A summation block 24 subtracts timestamp $ts_i$ (k) from a receive timestamp $tr_i$ (k), taken from receiver clock reference 26, to produce a network delay $n_i$ (k). Therefore, $n_i$ (k) represents the delay of the packet of data k in talkspurt i.

The delay estimator 12 is adapted to use the network delay of received packets of data 22 and to estimate the max packet delay m; for all the packets in talkspurt i. It should be noted that if the playout delay is not les than the maximum network delay experienced by any packet of data 22 in that talkspurt, there will be no packet loss at playout time due to delayed arrival of these packets of data 22. The delay estimator 12 implements a "max" function 28, which calculates maximum network delay experienced by any packet of data 22 during a talkspurt, i.e., if $m_i$ is maximum network delay for a talkspurt, the delay estimator module 12 calculates $m_i$=max (for all received packets of data in the talkspurt i ) $n_i(k)$.

Referring again to FIG. 1, the predictor module 18 includes a first filter module 30 adapted to a smoothed average of maximum packet delay indicative of observed maximum packet delay. For talkspurt i, the smoothed delay $d_i$ may be computed as:

$$d_i = \alpha * d_{i-1} + (1-\alpha) * m_i.$$

The predictor module 18 further includes a subtraction unit 32, which computes the variation for the current talkspurt i as the absolute value of the difference between $d_i$ and $m_i$. A second filter module 34, contained in the predictor module 18 computes a smoothed average variation of the calculated maximum packet delay $m_i$. In one embodiment of the present technique, this relation may be expressed as:

$$v_i = \alpha * v_{i-1} + (1-\alpha) * |m_i - d_i|.$$

The computed variables $m_i$, $d_i$ and $v_i$ is fed as input to a variability coefficient estimator module 36 (also referred as a β estimator module). The variability coefficient estimator module 36 may be configured to calculate a variability coefficient β for tracking fluctuations of the packet delay.

As illustrated in FIG. 1 above, the input of $m_i$ represented by 38, the input of $d_i$, represented as 40 and the input of $v_i$ represented as 42 are used to estimate the optimal value of β value using least squares method. The details of the β calculation will be explained in the subsequent sections. It should be noted that in one implementation of the present technique, the variability coefficient estimator module 36 may further include a correlation coefficient estimator module (not shown for clarity) or γ estimator module for calculating a correlation coefficient generally represented as γ. The correlation coefficient estimator module may also be adapted to control the rate of change of the variability coefficient β. It should be noted that the correlation coefficient estimator module may be dynamically adapted to achieve a specified level of loss representative of quality of reception of packet data for a real-time data.

In one implementation of the present technique, the variability coefficient estimator further includes a non-linear filter adapted to monitor positive and negative deviations of packet delays indicative of at least the smoothed maximum delay or the smoothed variance or the calculated maximum delay or the correlation coefficient or combinations thereof.

The computed β is used to compute the estimated playout time for packets in the next talkspurt (i.e., talkspurt i+1). A multiplier module 44 disposed in the predictor module 18 computes the product of current value of β and delay variation of the current talkspurt. This product may be used along with the current value of smoothed delay estimate and sender timestamp of the first packet (represented by reference numeral 46) of the next talkspurt by a summation module 48 to compute the playout time $P_i$ for the packets in the next talkspurt. This information of $P_i$ is fed as input to the player module 14 represented generally by reference numeral 50.

In other words, if the current talkspurt is i, the multiplier module 38 may compute $\beta * v_i$, which in turn may be used by the summation module 40 along with other inputs $d_i$ and $ts_{i+1}(k)$ to compute the packet playout time for packet k in talkspurt i+1. It should also be noted that β estimator module 36 implements fast increase-slow decrease principle. If there is a packet loss (due to late arrivals) during talkspurt i, then the β is rapidly increased. Likewise, when there is no loss the value of β will decrease slowly and may be estimated using least squares method. This technique seeks to minimize the weighted squared error between $m_i$ and the estimated playout delay by adjusting the value of β. The squared errors are weighted in an exponential manner which decays from the most recent to most distant error terms.

It should be noted that in the above technique, the smoothing average of maximum packet delay $m_i$, and its variation may be calculated using a smoothing algorithm. In one implementation of the present technique, the playout delay $P_i$ may be represented as:

$$P_i = d_{i-1} + \beta v_{i-1};$$

where $P_i$ is the predicted playout delay for talkspurt i.

The idea of fast increase and slow decrease in packet delay is realized with the present technique through rapid increase in β value during packet loss and slow decrease thereafter until it encounters next loss. The rate at which β value will decay may be dynamically adjusted as the session progresses to achieve preset packet loss percentage. β is increased whenever there is a packet loss and the increase in such a way that the playout delay for next talkspurt i+1 is at least $m_i$. This relation may be accomplished by the equation:

$$\beta = (m_i - d_{i-1})/v_{i-1}$$

In one implementation of the present technique, when there is no packet loss, then the β may be calculated using the following relations:

$$A_i = \gamma * A_{i-1} + (1-\gamma) * (m_i - d_{i-1}) * v_{i-1}$$

$$B_i = \gamma * B_{i-1} + (1-\gamma) * v^2_{i-1}$$

$$A_2 = (m_2 - d_1) * v_1, B_2 = v^2_1$$

$$\beta = A_i/B_i$$

The player module 14 in the system 10 may be adapted for playing only the received packet of data and to discard packets of data received after the predicted playout time. This module gets the playout time $P_i$ from predictor module and uses this input to playout the packet.

Finally, the system includes a buffer module 16, which buffers at least one packet data received from 20 for a variable amount of time as determined by the playout algorithm. When the packets playout time is reached the player module 14 picks up the packets from this buffer and plays out after which the packet data will be discarded.

In one embodiment of the present technique, the predictor module may include a device (not shown for clarity) adapted to compute at least a variable indicative of the smoothed maximum packet delay, the smoothed average variance and the variability coefficient as explained earlier. It should be noted that the above explanations with regard to FIG. 1, may be adapted for the system where the clocks at the sender endpoint and the receiver endpoint are synchronized. However, in certain implementation of the present technique, a playout packet delay system may be adapted to work when the clocks at the sender endpoint and the receiver endpoint may not be synchronized. This will be explained in further details in the subsequent sections to follow.

Figure 2:
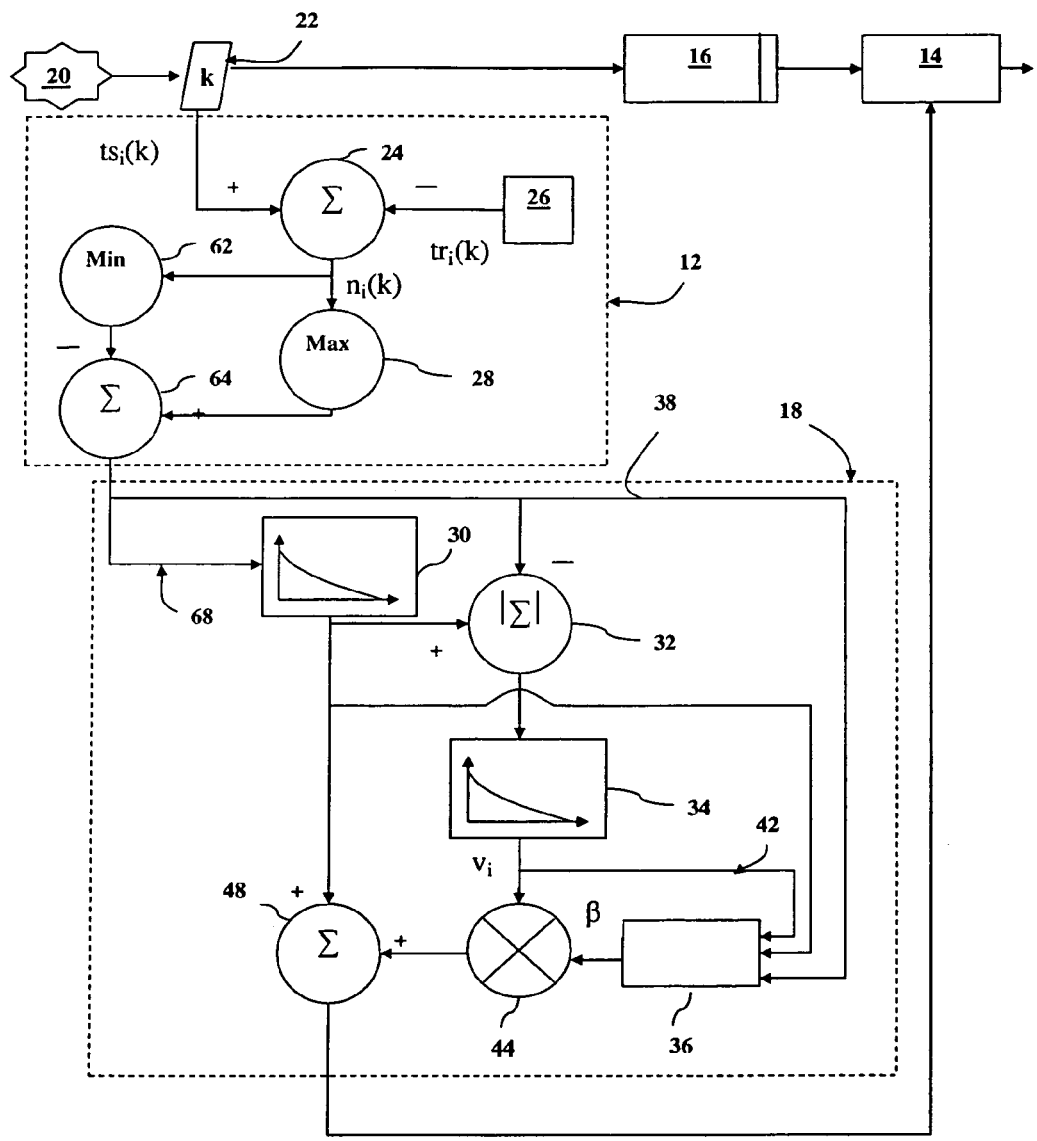
FIG. 2 is a block diagram illustrating a playout packet delay system wherein sender and receiver clocks may not be synchronized, in accordance with an aspect of the present technique.

Referring now to FIG. 2, a block diagram illustrating a playout packet delay system 60 wherein the clocks of the endpoints may not be synchronized, in accordance with an aspect of the present technique is disclosed. As illustrated in FIG. 2, several components functions in a similar manner as discussed with respect to FIG. 1. However, the system 60 provides a technique to implement the above mentioned technique, when the clocks at the sender and the receiver are not synchronized. The system 60 includes a time delay estimator module 62 and a summation module 64. The time delay estimator module 62 may be adapted to calculate a minimum time delay of packets of data between the sender and the receiver. Therefore, the time delay estimator module 62 takes in the input data as $n_i(k)$ and $m_i$ and calculates the minimum time delay of packets of data between the sender and the receiver.

As discussed earlier, the talkspurt delay estimator computes the maximum packet delay ($m_i$) for received packets in the talkspurt. The delay estimator module 62 computes the minimum delay of all the packets of data received in a particular session. This minimum delay of all the packets of data received may be thought of as the fixed delay component incurred due to propagation delay in the network. The summation module 64 takes this $m_i$ and the minimum value of packets delay to calculate the variable component of the packet delay. The variable component represents the queuing delay experienced by the packet of data in the network. The variable delay component is fed into the predictor module instead of $m_i$. The predictor module may compute the buffering delay, which determines how long the packet will be buffered before being played. The playout time in this case is calculated as tri $(k)+B_i$ (buffering delay). Thus, this technique eliminates the need for synchronization between end points.

While the preceding discussions were intended to provide details of a system for dynamically managing packet delay of at least one received packet of data between multiple endpoints, the following discussions provide details of the β estimation and the γ estimation. The details of these estimations will be generally explained with respect to the subsequent FIGS. 3-4.

Figure 3:
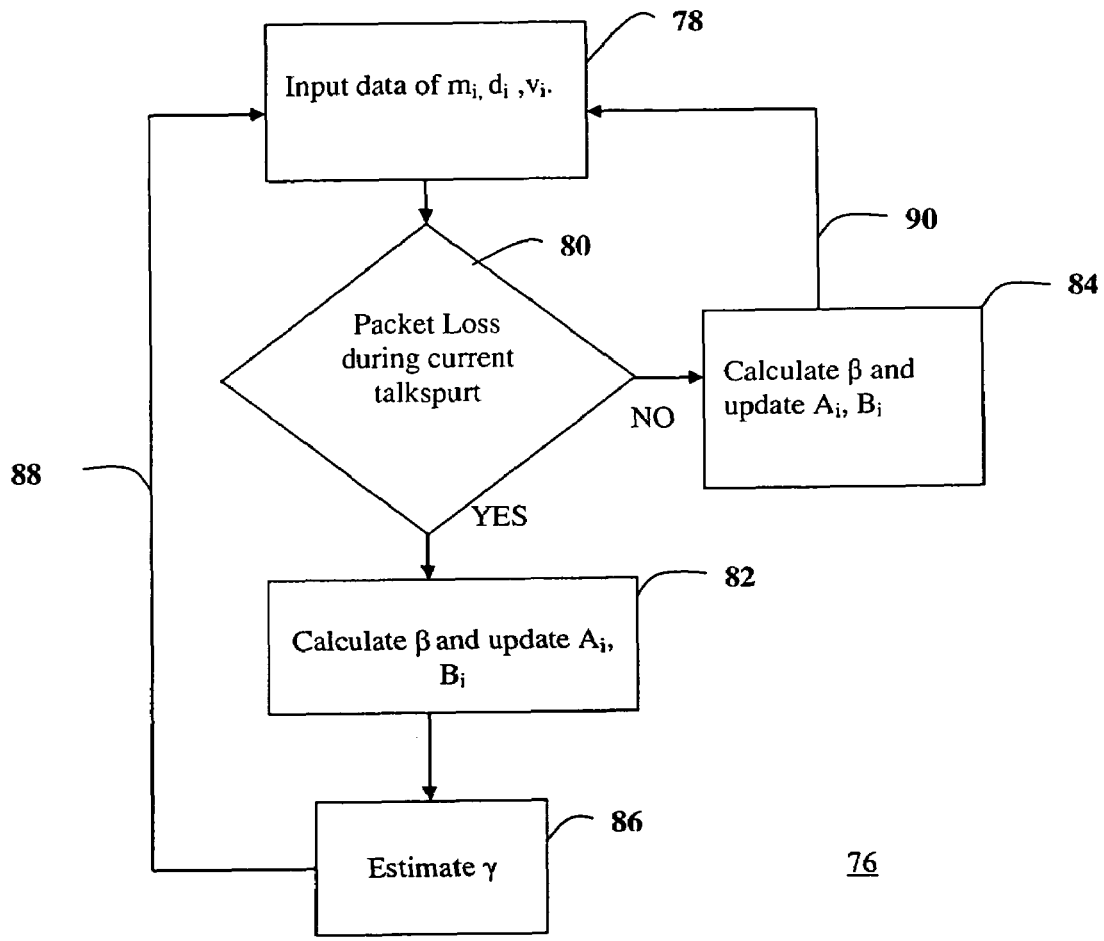
FIG. 3 is a block diagram illustrating a method of calculating variability coefficient of the playout delay system, in accordance with an aspect of the present technique.

Referring now to FIG. 3, a block diagram illustrating a method 76 of calculating the variability coefficient of the playout delay system using the variability coefficient estimator module, in accordance with an aspect of the present technique is disclosed. The method starts in block 78, wherein the β estimator module or the variability coefficient estimator module 36 implements fast increase-slow decrease principle using the values of $m_i$, $d_i$ and $v_i$. The details of these were discussed in earlier sections above. If there is a packet loss (due to late arrivals) during talkspurt i, β may be rapidly increased to a value represented by the equation:

$$\beta = (m_i - d_{i-1})/v_{i-1}$$

Likewise, when there is no loss the value of β will decrease slowly and may be estimated using least squares method. This method 76 seeks to minimize the weighted squared error between $m_i$ and the estimated playout delay by adjusting the value of β. The squared errors are weighted in an exponential manner which decays from the most recent to most distant error terms.

In one implementation of the present technque, let $$E_i = (1-\gamma)e_i^2 + (1-\gamma)\gamma e_{i-1}^2 + \ldots + \gamma^{i-2}e_2^2$$

where $e_i = m_i - (d_{i-1} + \beta v_{i-1})$, $\gamma \in (0,1)$. γ is the weighing factor that smoothens error $e_i$. The optimal value of β that minimizes $E_i$ may be given by the following:

$$\beta = A_i/B_i$$

where $A_i = \gamma * A_{i-1} + (1-\gamma) * (m_i - d_{i-1}) * v_{i-1}$, $$B_i = \gamma * B_{i-1} + (1-\gamma) * v_{i-1}^2$$

The rate at which β decays may be dependent on value of γ. The higher the value of γ slower the decay. Hence, γ value may be chosen so as to control the rate of change of β. The value of γ may be estimated based on the past delay samples.

Referring again to FIG. 3, in step 80, if there is packet loss, the method branches to step 82 where it calculates β according to equation $\beta = (m_i - d_{i-1})/v_{i-1}$ and updates the value of $A_i$ and $B_i$. This may be generally represented by:

$$A_i = m_i - d_{i-1}$$

$$B_i = v_{i-1},$$

If there is no packet loss the method branches to step 84 from step 80 where $A_i$ and $B_i$ are updated based on the equation $A_i = \gamma A_{i-1} + (1-\gamma)(m_i - d_i)v_{i-1}$, and $B_i = \gamma B_{i-1} + (1-\gamma)v_{i-1}^2$ respectively and β is calculated according to equation $\beta = A_i/B_i$. In step 86 the value weighing factor γ is estimated. This value weighing factor may also be referred as correlation coefficient. Note that γ is estimated only when there is packet loss. The algorithm initializes $A_i$ and $B_i$ may be represented as:

$$A_2 = (m_2 - d_i) * v_i, B_2 = v_i^2$$

Finally, the output of γ is fedback to step 78 indicated by reference numeral 88. Likewise, when there is no packet loss, then the output of step 84 is fedback to step 78 as indicated by reference numeral 90.

Figure 4:
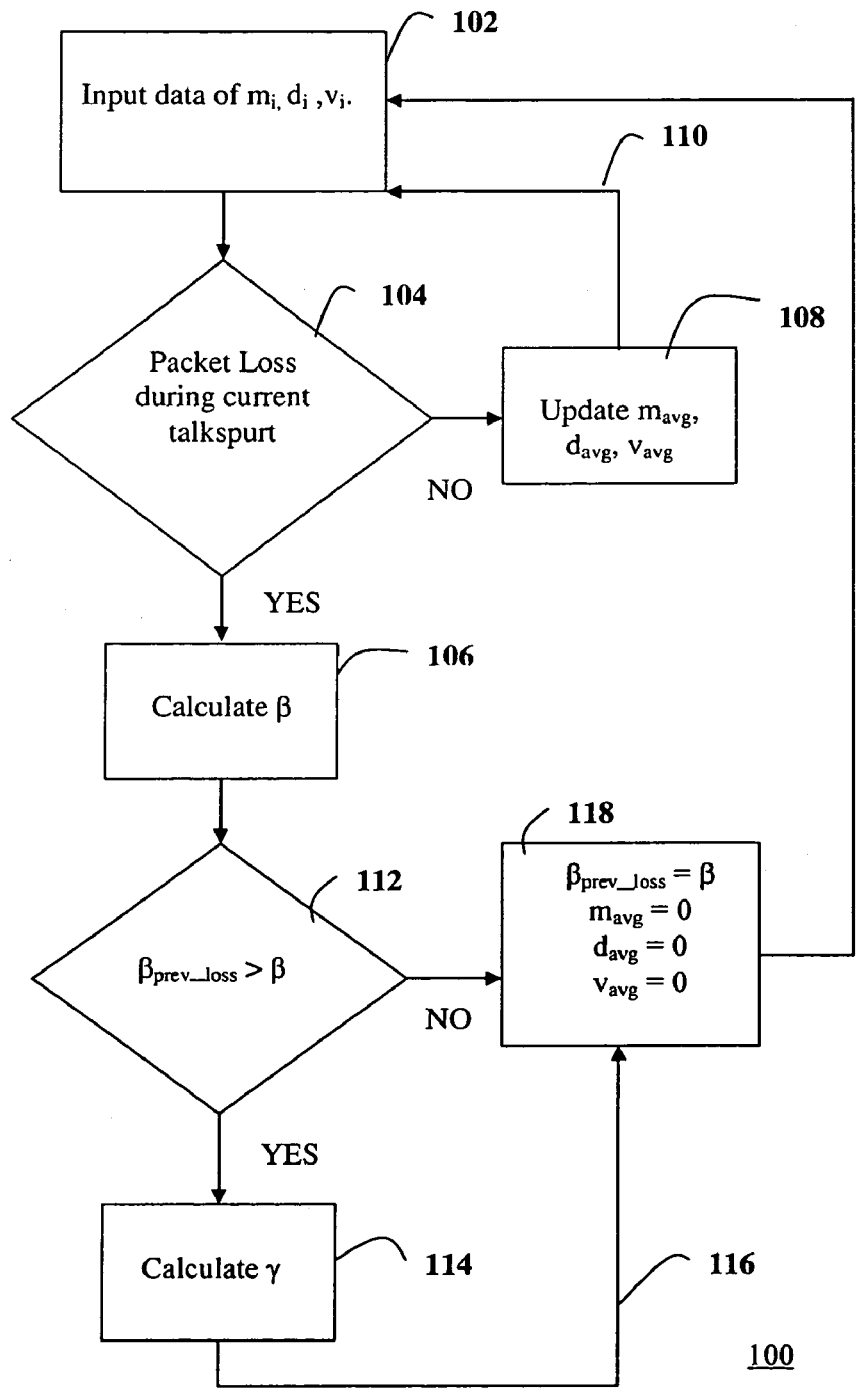
FIG. 4 is a block diagram illustrating method of calculating a correlation coefficient of the playout delay system, in accordance with an aspect of the present technique.

Referring to FIG. 4, a block diagram illustrating method 100 of calculating a correlation coefficient of the playout delay system, in accordance with an aspect of the present technique is disclosed. The correlation coefficient or γ may be computed only when there is packet loss in a talkspurt.

The method starts in step 102, which is similar to FIG. 4, where the β estimator module 36 collects $m_i$, $d_i$ and $v_i$ data. In step 104, packet loss during the current talkspurt is determined. If there is packet loss, the method branches to step 106 where it calculates β as explained with reference to FIG. 3. If there is no packet loss the method branches to step 108 from step 106 where $m_{avg}$, $d_{avg}$ and $v_{avg}$ are updated based on the observed delay samples and estimated values of $d_i$ and $v_i$. In one embodiment of the present technique, the method may be accomplished by the following implementation:

Let i and i+j+1 (j>0) be the two talkspurt such that there were packet losses in both these talkspurt but no packet loss during intermediate talkspurt. In this case, then the γ may be computed as:

$$\gamma^i = (\beta * v_{avg}^2 - (m_{avg} - d_{avg})v_{avg})/((A_i - \beta * B_i) - ((m_{avg} - d_{avg})v_{avg} - \beta * v_{avg}^2))$$

where $m_{avg} = \Sigma_{k=i+1}^{i+j} m_k/j$, $d_{avg} = \Sigma_{k=i+1}^{i+j} d_k/j$, $v_{avg} = \Sigma_{k=i+1}^{i+j} v_k/j$, $\beta = (m_{i+j+1} - d_{i+j})/v_{i+j}$.

The output of step 108 may be fedback into step 102 indicated by reference numeral 110. In step 112, a decision may be provided on the value of $\beta_i$ with respect to $\beta_{prev\_loss}$. If $\beta_{prev\_loss}$ is greater than β (β value as computed in the most recent talkspurt with packet loss), then the expression $\gamma^i = (\beta * v_{avg} - (m_{avg} - d_{avg})v_{avg})/((A_i - \beta * B_i) - ((m_{avg} - d_{avg})v_{avg} - \beta * v_{avg}^2))$ may be used to estimate the value of γ in step 114. The output of step 114 uses the algorithm and sets the value of $\beta_{prev\_loss}$ to β, updates $m_{avg}$, $d_{avg}$ and $v_{avg}$ to zero as represented by reference numeral 116. If $\beta_{prev\_loss}$ is lesser than β then the algorithm proceeds to step 118, wherein the $\beta_{prev\_loss}$ is initialized to zero at the start of the algorithm. The value of γ thus calculated along with $m_{prev\_loss}$ (maximum packet delay during immediate previous loss i.e. during talkspurt i) is stored in a table. Whenever there is a loss due to late arrivals, the maximum packet delay among the lost packets may be matched with closest $m_{prev\_loss}$ in the table and corresponding of γ is used for the computation of β for the following talkspurt in step 118, wherein the $\beta_{prev\_loss}$ is initialized to zero at the start of the algorithm.

Figure 5:
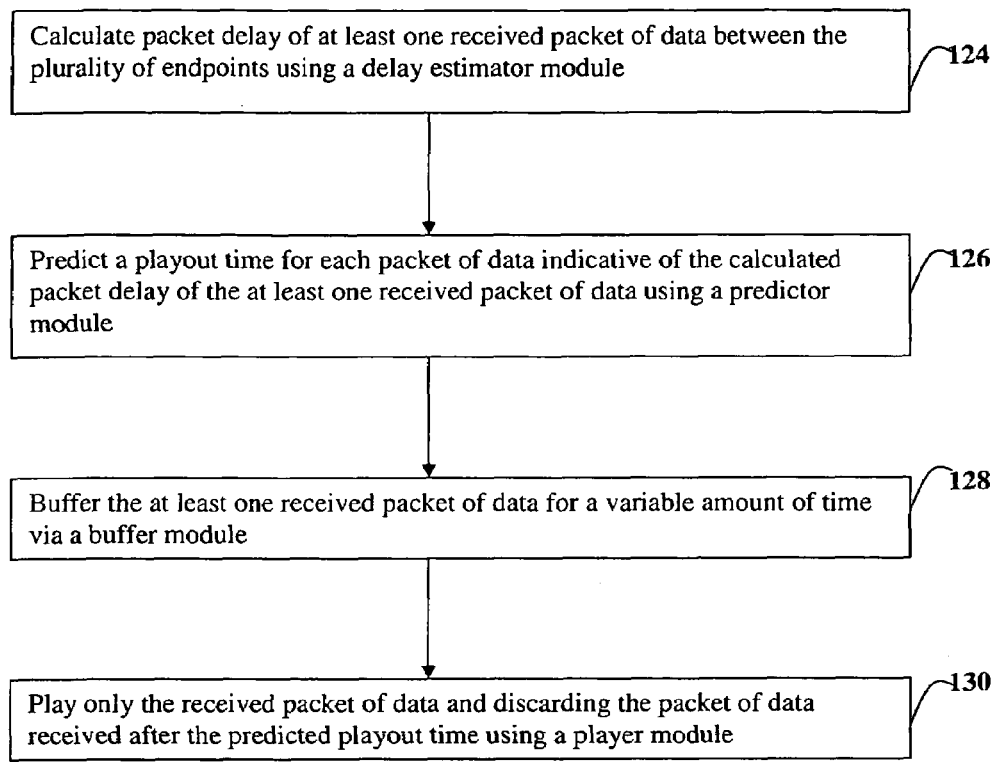
FIG. 5 is a flowchart illustrating a method of exchanging at least one received packet of data between multiple end points in real time information, in accordance with an aspect of the present technique.

Referring now to FIG. 5, a flowchart illustrating a method 122 for exchanging at least one received packet of data between multiple end points in real time information, in accordance with an aspect of the present technique is disclosed. The method 122 starts in step 124 by calculating packet delay of the at least one received packet of data using a delay estimator module. It should be noted that the delay estimator module may be adapted to calculate maximum packet delay of all the packets of data received in an interval within a predetermined threshold indicative of the calculated packet delay. In one implementation of the present technique, synchronization of time between the plurality of end points may be done by the delay estimator module.

The method continues in step 126, wherein the playout time may be predicted for each packet of data indicative of the calculated packet delay of the at least one received packet of data using the predictor module. In one embodiment of the present technique, the predictor module includes a variability coefficient estimator module, wherein fluctuations of packet delay may be tracked using the variability coefficient estimator module and may be configured to calculate variability coefficient. In another embodiment of the present technique, the predictor module may include a correlation coefficient estimator module adapted for controlling rate of change of the fluctuations of packet delay. In yet another embodiment of the present technique, the predictor module may be adapted to calculate a variable indicative of the smoothed maximum packet delay, the smoothed average variance and the variability coefficient. The detail calculation of the method of calculating the packet delay and predicting the playout time is explained in earlier sections with reference to FIGS. 1-4.

Furthermore, the method proceeds in step 128 by buffering the at least one received packet of data for a variable amount of time via the buffer module. Finally, at step 130, only the received packet of data may be played and the packets of data received after the predicted playout time may be discarded using the player module.

In one embodiment of the present technique, the predictor module may include a first filter module adapted for computing a smoothed average of maximum packet delay indicative of observed maximum packet delay. In another embodiment of the present technique, the predictor module may include a second filter module configured for computing a smoothed average variation of the calculated maximum packet delay. In yet another embodiment of the present technique, the predictor module may also be adapted for computing one or more variables based on calculated delay, variance and observed maximum delay using one or more filter modules and using ratio of the at least one variable to decrement value of the variability coefficient estimator module. In this method, the received packets of data are exchanged between multiple endpoints in real time information.

As will be appreciated by those of ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The sequence of instructions as explained in the method steps may include but not limited to, code adapted to calculate packet delay of at least one received packet of data received via a delay estimator module and code adapted to predict a playout time for each packet of data indicative of the calculated delay of the at least one received packet of data via a predictor module. The method steps may further include code adapted to buffer the at least one received packet of data for a variable amount of time via a buffer module and code adapted to play only the received packet of data and discard packets of data received after the predicted playout time via a player module. It should be noted as mentioned earlier, the delay estimator is adapted to calculate maximum delay of all the packets of data received in an interval within a predetermined threshold indicative of the calculated packet delay. Though reference is made to the above mentioned code adapted to execute a predefined sequence of instructions, as will be appreciated by people skilled in the art, other similar code adapted to achieve similar results as explained in the present technique may also be implemented.

As will be appreciated by a person skilled in the art, the various implementations of the present technique provide a variety of advantages. For example, the present technique may not require a separate spike detection algorithm. Spike constitutes a sudden, large increase in the end-to-end network delay, followed by a series of packets arriving almost simultaneously, leading to the completion of spike. Moreover, since packet delay, variation and other computations as explained in above sections are done at most only once in a talkspurt, computational complexity is very low. Furthermore, the present technique may produce same result even if we use the variable portion of the packet delay instead of end-to-end delay. Therefore the present technique may be used even when there is no sender-receiver clock synchronization. Finally, the playout delay can be optimized with respect to mean Opinion Score (MOS). In order to assess the quality in voice communication in the presence of impairments, it is crucial to study the individual as well as collective effects of the impairments and produce quantitative measures that reflect the subjective rating that listeners would give. This subjective quality measure is known as mean opinion score.

While only certain features of the invention have been illustrated and described herein, many modifications and changes will occur to those skilled in the art. It is, therefore, to be understood that the appended claims are intended to cover all such modifications and changes as fall within the true spirit of the invention.

What we claimed is:

1. A system for dynamically managing packet delay of at least one received packet of data between a plurality of endpoints, comprising:
   a delay estimator module adapted to calculate the packet delay of the at least one received packet of data;
   a predictor module adapted for predicting a playout time for each received packet of data indicative of the calculated packet delay of the at least one received packet of data, wherein the predictor module further comprises a variability coefficient estimator module adapted to calculate variability coefficient for tracking fluctuations of the packet delay, and the predictor module further comprises a device adapted to compute at least a variable indicative of smoothed maximum packet delay, a smoothed average variance and the variability coefficient;

a correlation coefficient estimator module configured to calculate a correlation coefficient and adapted to control the rate of change of the variability coefficient;

a buffer module adapted for buffering the at least one received packet of data for a variable amount of time; and a player module adapted for playing only the received packet of data and to discard packets of data received after the predicted playout time;

wherein the delay estimator module is adapted to calculate maximum delay of all the packets of data received in an interval within a predetermined threshold indicative of the calculated packet delay.

2. The system as recited in claim 1, wherein the predictor module further comprises a first filter module adapted to compute a smoothed average of maximum packet delay indicative of observed maximum packet delay.

3. The system as recited in claim 1, wherein the predictor module further comprises a second filter module adapted to compute a smoothed average variation of the calculated maximum packet delay.

4. The system as recited in claim 1, wherein the variability coefficient estimator module further comprise a non-linear filter adapted to monitor positive and negative deviations of packet delays indicative of at least the smoothed maximum packet delay or the smoothed average variance or the calculated maximum packet delay or the correlation coefficient or combinations thereof.

5. The system as recited in claim 1, wherein the correlation coefficient estimator module is dynamically adapted to achieve a specified level of loss representative of quality of reception for a real-time data.

6. The system as recited in claim 1, wherein the packets of data include at least one of a voice, videophone, or other real-time interactive communication or combinations thereof.

7. The system as recited in claim 1, wherein the delay estimator is adapted to synchronize time between the plurality of endpoints.

8. A method of exchanging at least one received packet of data between a plurality of end points in real time information, comprising the steps of:

calculating packet delay of the at least one received packet of data between the plurality of endpoints using a delay estimator module;

predicting a playout time for each packet of data indicative of the calculated packet delay of the at least one received packet of data using a predictor module;

tracking fluctuations of packet delay using a variability coefficient estimator module, wherein the variability coefficient estimator module is disposed in the predictor module and is configured to calculate variability coefficient;

calculating a correlation coefficient and controlling rate of change of the fluctuations of packet delay via a correlation coefficient estimator module;

buffering the at least one received packet of data for a variable amount of time via a buffer module; and playing only the received packet of data and discarding the packet of data received after the predicted playout time using a player module;

wherein the delay estimator module is adapted to calculate maximum packet delay of all the packets of data received in an interval within a predetermined threshold indicative of the calculated packet delay.

9. The method as recited in claim 8, further comprising computing a smoothed average of maximum packet delay indicative of observed maximum packet delay using a first filter module, wherein the first filter module is disposed in the predictor module.

10. The method as recited in claim 8, further comprising computing a smoothed average variation of the calculated maximum packet delay using a second filter module disposed in the predictor module.

11. The method as recited in claim 8, wherein playing further comprises computing one or more variables based on calculated packet delay, smoothed average variance and observed maximum delay using one or more filter modules and using ratio of the at least one variable to decrement value of the variability coefficient estimator module.

12. The method as recited in claim 11, wherein predicting the playout time further comprising calculating at least a variable indicative of the smoothed maximum packet delay, a smoothed average variance and the variability coefficient using the predictor module.

13. The method as recited in claim 8, wherein the packets of data include at least one of a voice, videophone, or other real-time interactive communication or combinations thereof.

14. The method as recited in claim 8, further comprising synchronization of time between the plurality of end points using the delay estimator.

15. A computer readable medium having computer readable instructions recorded thereon, said computer readable instructions comprising:

instructions for calculating packet delay of at least one received packet of data received via a delay estimator module;

instructions for predicting a playout time for each packet of data indicative of the calculated packet delay of the at least one received packet of data via a predictor module;

instructions for buffering the at least one received packet of data for a variable amount of time via a buffer module; and instructions for playing only the received packet of data and discard packets of data received after the predicted playout time via a player module;

instructions for tracking fluctuations of packet delay using a variability coefficient estimator module, wherein the variability coefficient estimator module is disposed in the predictor module and is configured to calculate variability coefficient;

instructions for calculating a correlation coefficient and controlling rate of change of the fluctuations of packet delay via a correlation coefficient estimator module;

wherein the delay estimator module is adapted to calculate maximum packet delay of all the packets of data received in an interval within a predetermined threshold indicative of the calculated packet delay.

16. A computer program product, comprising a computer usable medium having a computer readable program code embodied therein to define distinct software modules comprising a delay estimator module, a predictor module, a buffer module, and a player module, said computer readable program code adapted to be executed to implement a method of exchanging at least one received packet of data between a plurality of end points in real time information, said method comprising:

calculating packet delay of the at least one received packet of data between the plurality of endpoints using said delay estimator module;

predicting a playout time for each packet of data indicative of the calculated packet delay of the at least one received packet of data using said predictor module;

tracking fluctuations of packet delay using a variability coefficient estimator module, wherein the variability coefficient estimator module is disposed in the predictor module and is configured to calculate variability coefficient;

calculating a correlation coefficient and controlling rate of change of the fluctuations of packet delay via a correlation coefficient estimator module;

buffering the at least one received packet of data for a variable amount of time via said buffer module; and playing only the received packet of data and discarding the packet of data received after the predicted playout time using said player module;

wherein said delay estimator module is adapted to calculate maximum packet delay of all the packets of data received in an internal within a predetermined threshold indicative of the calculated packet delay.

* * * * *